(12) United States Patent  
Seki et al.

(10) Patent No.: US 9,573,502 B2  
(45) Date of Patent: Feb. 21, 2017

(54) SEAT CUSHION DEVICE

(71) Applicant: UD Trucks Corporation, Saitama (JP)

(72) Inventors: Kunio Seki, Saitama (JP); Tsubasa Yahagi, Saitama (JP)

(73) Assignee: UD TRUCKS CORPORATION, Saitama (JP)

( * ) Notice: Subject to any disclaimer, the term of this patent is extended or adjusted under 35 U.S.C. 154(b) by 0 days.

(21) Appl. No.: 14/364,433

(22) PCT Filed: Oct. 10, 2012

(86) PCT No.: PCT/JP2012/076221  
§ 371 (c)(1),  
(2) Date: Jun. 11, 2014

(87) PCT Pub. No.: WO2013/088826  
PCT Pub. Date: Jun. 20, 2013

(65) Prior Publication Data  
US 2014/0333107 A1   Nov. 13, 2014

(30) Foreign Application Priority Data  
Dec. 15, 2011   (JP) ................................. 2011-274650

(51) Int. Cl.  
*B60N 2/18* (2006.01)  
*B60N 2/62* (2006.01)  
(Continued)

(52) U.S. Cl.  
CPC ............... *B60N 2/62* (2013.01); *B60N 2/161* (2013.01); *B60N 2/1635* (2013.01);  
(Continued)

(58) Field of Classification Search  
CPC ........... A47C 7/46; A47C 7/462; A47C 7/467; B60N 2/02; B60N 2/0224; B60N 2/62;  
(Continued)

(56) References Cited

U.S. PATENT DOCUMENTS 3,550,953 A   12/1970   Neale  
3,883,173 A   5/1975   Shephard et al.  
(Continued)

FOREIGN PATENT DOCUMENTS

DE   3643875 A1   6/1988  
GB   2255905 A    11/1992  
(Continued)

OTHER PUBLICATIONS

Australian Office Action dated May 12, 2015.  
Extended European Search Report dated Jul. 10, 2015.

*Primary Examiner* — Philip Gabler  
(74) *Attorney, Agent, or Firm* — Rabin & Berdo, P.C.

(57) ABSTRACT

A seat cushion device capable of adjusting hardness of a seat cushion including a seating surface, on which a user is seated, includes a recessed part that is formed in a back surface of the seating surface in the seat cushion, a left plate that faces a back surface of a left thigh holding part of the seating surface, on which a left leg thigh of the user is located, and that is movable inside the recessed part vertically, a right plate that faces a back surface of a right thigh holding part of the seating surface, on which a right leg thigh of the user is located, and that is movable inside the recessed part vertically, and a gap adjustment mechanism that moves the left plate and the right plate vertically in an independent manner, and that can adjust a clearance from the back surface of the seating surface.

20 Claims, 8 Drawing Sheets

(51) Int. Cl.
*B60N 2/44* (2006.01)
*B60N 2/16* (2006.01)
*B60N 2/64* (2006.01)
*B60N 2/02* (2006.01)

(52) U.S. Cl.
CPC ......... *B60N 2/1814* (2013.01); *B60N 2/4415* (2013.01); *B60N 2/646* (2013.01); *B60N 2002/026* (2013.01); *B60N 2205/30* (2013.01)

(58) Field of Classification Search
CPC .... B60N 2/1814; B60N 2/4415; B60N 2/161; B60N 2/1635; B60N 2/646; B60N 2205/30; B60N 2002/026
See application file for complete search history.

(56) References Cited

U.S. PATENT DOCUMENTS

| | | | |
|---|---|---|---|
| 4,541,669 A | 9/1985 | Goldner | |
| 4,644,593 A * | 2/1987 | O'Brien | 5/613 |
| 4,655,505 A * | 4/1987 | Kashiwamura et al. | 297/284.6 |
| 4,969,684 A * | 11/1990 | Zarotti | 297/180.12 |
| 6,663,178 B2 * | 12/2003 | Fourrey et al. | 297/284.3 |
| 6,851,755 B2 * | 2/2005 | Dinkel | A47C 4/54 297/284.3 |
| 7,152,920 B2 * | 12/2006 | Sugiyama et al. | 297/284.6 |
| 7,159,255 B2 * | 1/2007 | Piraino | 5/238 |
| 2002/0108180 A1 | 8/2002 | Odderson | |
| 2007/0273188 A1 * | 11/2007 | Morrison | 297/284.3 |
| 2010/0276973 A1 * | 11/2010 | Zenk et al. | 297/284.3 |

FOREIGN PATENT DOCUMENTS

| | | |
|---|---|---|
| JP | 57-147931 A | 9/1982 |
| JP | S58-47262 U | 3/1983 |
| JP | 58-098238 U | 7/1983 |
| JP | S58-126238 U | 8/1983 |
| JP | S59-75842 A | 4/1984 |
| JP | 61-022501 Y2 | 7/1986 |
| JP | 63-013839 A | 1/1988 |
| JP | H05-176823 A | 7/1993 |
| JP | 2007-325674 A | 12/2007 |

* cited by examiner

SEAT CUSHION DEVICE

TECHNICAL FIELD

The present invention relates to a seat cushion device of a seat.

BACKGROUND ART

Seats that are capable of adjusting front/rear positions, seating surface heights and the like according to figures of users have been conventionally used in vehicles such as automobiles.

JP05-176823A discloses a seat cushion device that is capable of adjusting hardness of a seating surface according to a preference of a user. According to this seat cushion device, a cushion plate that abuts against the lower surface of a cushion pad for seating is moved vertically, so as to adjust a pressing force applied to the lower surface of the cushion pad, and to adjust the hardness of the cushion pad.

Incidentally, a driver of the automobile operates an accelerator pedal and a brake pedal by the right leg, and operates a clutch pedal by the left leg, when the automobile is a manual transmission vehicle. Further, when the driver of the automobile drives mainly in town, the frequency of operating the clutch pedal is high as the shift is changed frequently, but when the driver of the automobile drives mainly on expressway, the frequency of operating the clutch pedal is low as the shift is changed less frequently. Thus, driving operation by the left and right legs of the driver changes according to the type of the automobile, environment of a driving road, and the like.

SUMMARY OF INVENTION

According to the seat cushion device of JP05-176823A, however, a degree of compression of the seat cushion is adjusted by a single cushion plate, and it is difficult to adjust the hardness of the seating surface according to a need of the driver due to a difference in the driving operation.

The present invention is made in view of the above-described problem, and it is an object of the present invention to make the hardness of the seat cushion adjustable according to the need of the user due to the difference in the driving operation.

According to one aspect of this invention, a seat cushion device capable of adjusting hardness of a seat cushion including a seating surface, on which a user is seated is provided. The seat cushion device includes: a recessed part that is formed in a back surface of the seating surface in the seat cushion; a left plate that faces a back surface of a left thigh holding part of the seating surface, on which a left leg thigh of the user is located, and that is movable inside the recessed part vertically; a right plate that faces a back surface of a right thigh holding part of the seating surface, on which a right leg thigh of the user is located, and that is movable inside the recessed part vertically; and a gap adjustment mechanism that is configured to move the left plate and the right plate vertically in an independent manner, and that can adjust a clearance from the back surface of the seating surface.

The details as well as other features and advantages of this invention are set forth in the remainder of the specification and are shown in the accompanying drawings.

DESCRIPTION OF EMBODIMENTS

Hereinafter, embodiments of the present invention will be explained with reference to the drawings.

First Embodiment

Hereinafter, a seat cushion device 100 according to a first embodiment of the present invention will be explained with reference to FIG. 1 to FIG. 5.

First, the structure of the seat cushion device 100 will be explained with reference to FIG. 1 to FIG. 3.

The seat cushion device 100 is provided with a seat cushion 1 including a seating surface 2, on the upper surface of which a user is seated. Hardness of the seat cushion 1 of the seat cushion device 100 can be adjusted. The seat cushion device 100 is attached to a seat rail (not illustrated) that is fixed onto a floor surface of a cabin, in such a manner that its position in the front/rear direction can be adjusted. The seat cushion device 100 is mainly used in a driver's seat of an automobile. Hereinafter, an explanation will be given to the case where the user of the seat cushion device 100 is the driver of the automobile.

Figure 1:
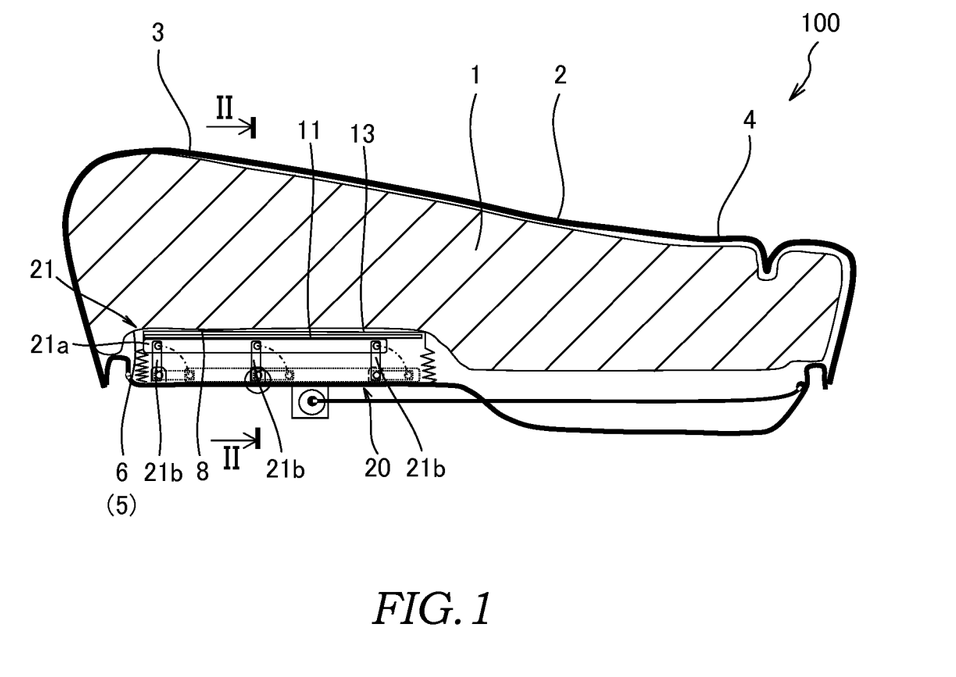
FIG. 1 is a cross-sectional view of the side surface of a seat cushion device according to a first embodiment of the present invention.

As illustrated in FIG. 1, the seat cushion 1 is formed to protrude at a front part 3 of the seating surface 2, and to gradually descend from the front part 3 toward a rear part 4. At the rear part 4 of the seat cushion 1, a backrest (not illustrated) is attached in such a manner that an angle with respect to the seat cushion 1 can be adjusted. The driver sits back so that his/her knees are located near the front part 3, and is seated on the seat cushion 1 to lean on the backrest.

Figure 2:
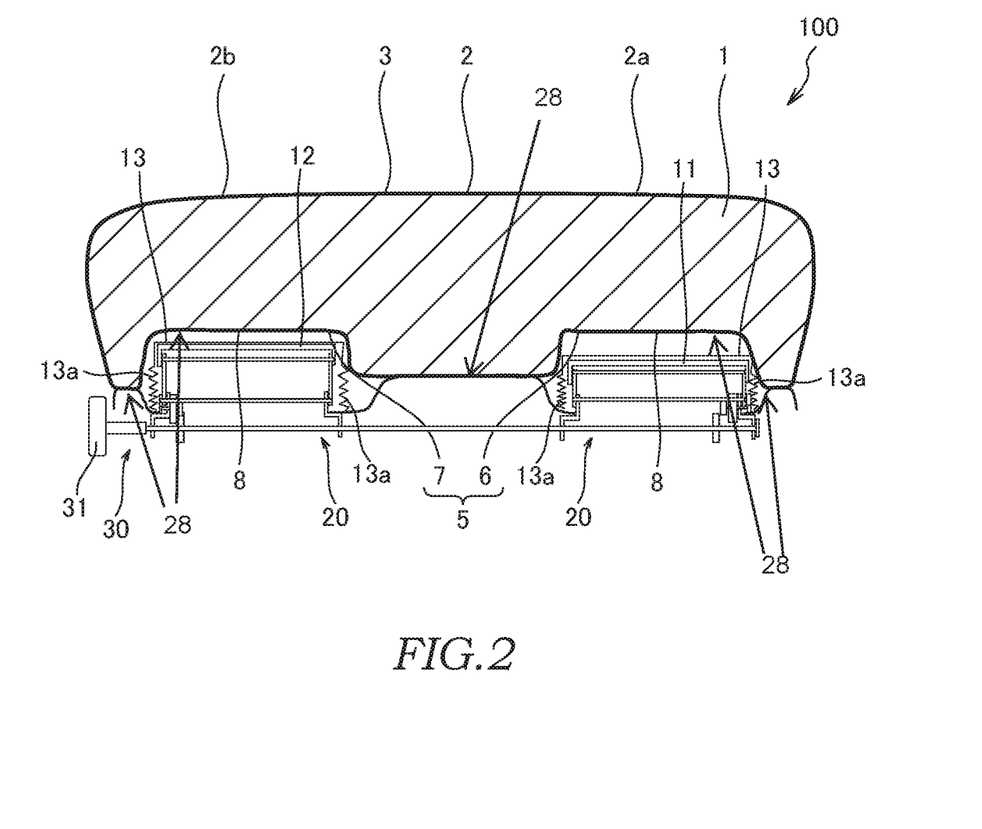
FIG. 2 is a cross-sectional view taken along the II-II line in FIG. 1.

As illustrated in FIG. 2, the seating surface 2 includes a left thigh holding part 2a on which a left leg thigh is located when the driver is seated on the seat cushion 1, and a right thigh holding part 2b on which a right leg thigh is located.

The seat cushion 1 includes a recessed part 5 formed by a left-side recessed part 6 and a right-side recessed part 7 that are formed in the back surface 28 of the seating surface 2. Although the recessed part 5 is formed dividedly into the left-side recessed part 6 and the right-side recessed part 7 according to this embodiment, a single recessed part may be formed instead.

The recessed part 5 is formed in a recessed manner in the back surface 28 of the portion where each thigh is located when the driver is seated on the seat cushion 1. Specifically, the left-side recessed part 6 is formed in the back surface 28 of the left thigh holding part 2a, and the right-side recessed part 7 is formed in the back surface 28 of the right thigh holding part 2b.

Each of the left-side recessed part 6 and the right-side recessed part 7 has a top surface part 8 as a substantially rectangular plane. The top surface part 8 is formed to be substantially parallel to the floor surface of the cabin.

The seat cushion device 100 is provided with a left plate 11 that is vertically movable inside the left-side recessed part 6, a right plate 12 that is vertically movable inside the right-side recessed part 7, and a pair of gap adjustment mechanisms 20 that can move the left plate 11 and the right plate 12 vertically in an independent manner, so as to adjust clearances from the back surface 28 of the seat cushion 1.

The left plate 11 is a flat plate that is made of metal and that faces the top surface part 8 on the back surface 28 of the left thigh holding part 2a. The left plate 11 is provided to be in parallel to the top surface part 8. The left plate 11 is formed to have a rectangular shape that is substantially identical to the top surface part 8. The vertical position of the left plate 11 inside the left-side recessed part 6 is adjusted by the gap adjustment mechanism 20. Thereby, the clearance between the left plate 11 and the top surface part 8 of the left-side recessed part 6 is adjusted.

The right plate 12 is a flat plate that is made of metal and that faces the top surface part 8 on the back surface 28 of the right thigh holding part 2b. The right plate 12 is provided to be in parallel to the top surface part 8. The right plate 12 is formed to have a rectangular shape that is substantially identical to the top surface part 8. The vertical position of the right plate 12 inside the right-side recessed part 7 is adjusted by the gap adjustment mechanism 20. Thereby, the clearance between the right plate 12 and the top surface part 8 of the right-side recessed part 7 is adjusted.

The pair of the gap adjustment mechanisms 20 is provided beneath the seat cushion 1 on the right and left sides. The structure of the gap adjustment mechanism 20 that moves the right plate 12 vertically is the same as that of the gap adjustment mechanism 20 that moves the left plate 11 vertically, and therefore, an explanation will be given only to the gap adjustment mechanism 20 that moves the left plate 11 vertically.

Figure 3:
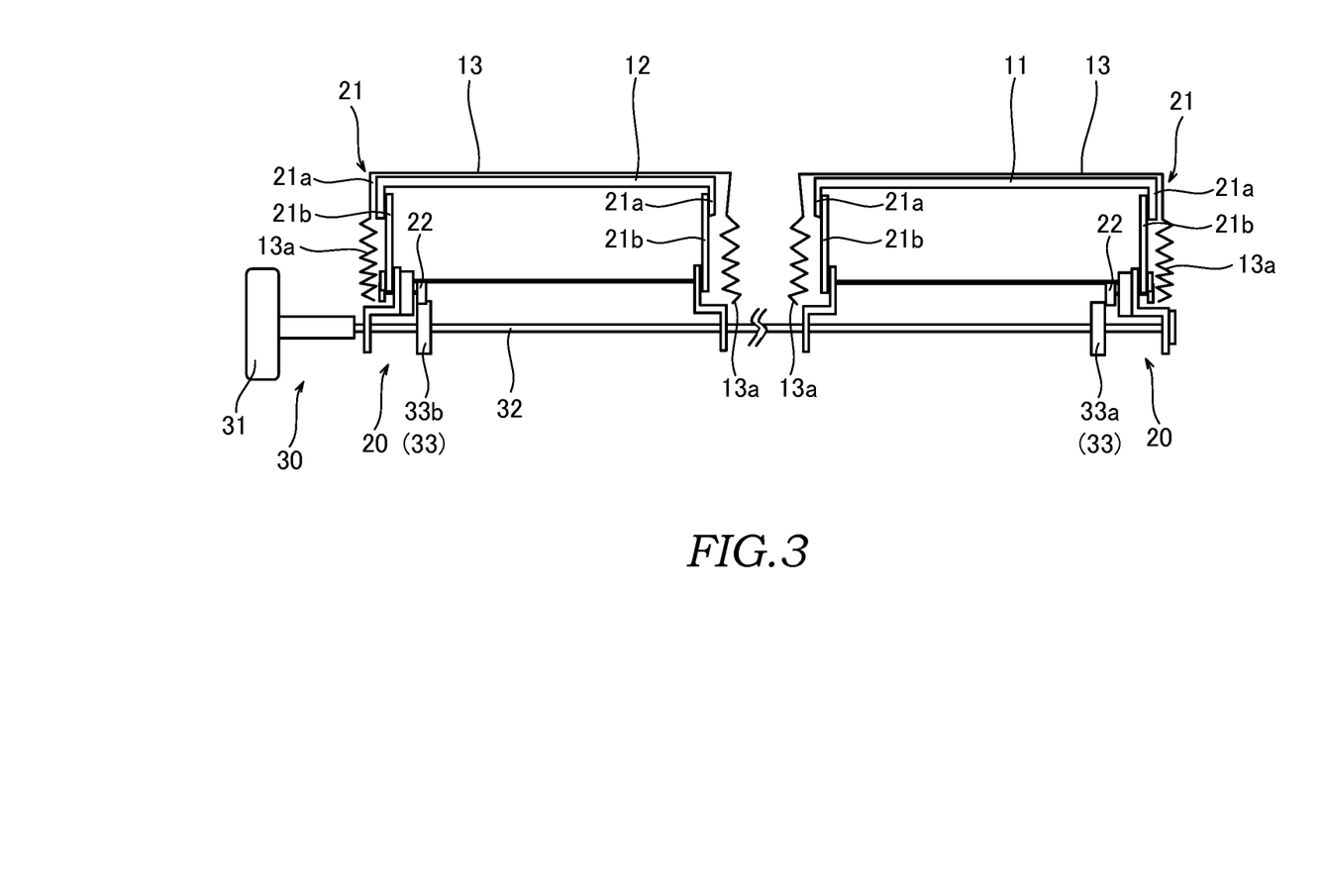
FIG. 3 is a front view of a gap adjustment mechanism in the seat cushion device according to the first embodiment of the present invention.

As illustrated in FIG. 3, the gap adjustment mechanism 20 is provided with a parallel link mechanism 21 that guides the left plate 11 vertically by rotating the left plate 11 toward the front/rear direction, a gear 22 that uses the rotation to allow the parallel link mechanism 21 to swing, and a gear rotation mechanism 30 that can make rotation operation of the gear 22.

The parallel link mechanism 21 includes a pair of vertically movable plates 21a that is provided on the right and left sides of the left plate 11 and that makes the vertical movement together with the left plate 11, and swing links 21b that are provided on the right and left sides of the left plate 11 and that swing together with the vertical movement of the left plate 11.

The vertically movable plates 21a are respectively fixed onto the both side surfaces of the left plate 11. The vertically movable plates 21a are flat plates that are made of metal and that extend downwardly from the both side surfaces of the left plate 11. The vertically movable plates 21a may be formed integrally with the left plate 11.

Each of the swing links 21b is attached to the floor surface of the vehicle on its one end, and is attached to the vertically movable plate 21a on the other end. The swing link 21b is provided in such a manner that the other end can swing around one end. As illustrated in FIG. 1, three swing links 21b are provided on each of the right and left sides, which swing in synchronization with each other.

Each of the swing links 21b can swing between the state where its longitudinal direction is horizontal and the state where its longitudinal direction is vertical. When the swing links 21b swing, the vertically movable plates 21a move vertically while drawing a circular arc locus. In other words, when the swing links 21b swing, the left plate 11 moves vertically.

As illustrated in FIG. 3, each of the gears 22 is a gear wheel that is provided at one end of the swing link 21b. When the gear 22 rotates, the swing links 21b swing. In other words, when the gear 22 rotates, the left plate 11 moves vertically.

The gear rotation mechanism 30 is provided with a dial 31 that is provided so that the driver can make rotation operation, a rotation shaft 32 that is provided coaxially with the dial 31 and that is movable in the axis direction, and an engagement part 33 that is engageable with each gear 22 by the movement of the rotation shaft 32 in the axis direction and that is rotated by the rotation operation of the dial 31.

As illustrated in FIG. 2, the dial 31 is provided near the right-side surface of the seat cushion 1. When the automobile is a car with a right-side steering wheel, the dial 31 can be operated by the right hand while the driver is seated. Incidentally, when the automobile is a car with a left-side steering wheel, the dial 31 may be provided near the left-side surface of the seat cushion 1.

The rotation shaft 32 is a shaft that rotates together with the dial 31 by the rotation of the dial 31. The rotation shaft 32 is extended in the width direction of the seat cushion 1.

The engagement part 33 includes a first engagement part 33a that engages with the gear 22 for making the vertical movement of the left plate 11 when the driver pushes in the rotation shaft 32 in the axis direction, and a second engagement part 33b that engages with the gear 22 for making the vertical movement of the right plate 12 when the driver pulls out the rotation shaft 32 in the axis direction. In other words, the engagement part 33 engages with the gear 22 that makes the vertical movement of the left plate 11 when the driver moves the rotation shaft 32 to a first position in the axis direction, and engages with the gear 22 that makes the vertical movement of the right plate 12 when the driver moves the rotation shaft 32 to a second position that is different from the first position.

The first engagement part 33a is a gear that is fixed to the rotation shaft 32 and that rotates together with the rotation shaft 32. The first engagement part 33a is provided at the position facing the left-side recessed part 6 of the seat cushion 1. By the movement of the rotation shaft 32 in the axis direction, the first engagement part 33a is switched between the state where it engages with the gear 22 of the gap adjustment mechanism 20 that makes the vertical movement of the left plate 11 and the state where it does not engage therewith.

Similarly, the second engagement part 33b is a gear that is fixed to the rotation shaft 32 and that rotates together with the rotation shaft 32. The second engagement part 33b is provided at the position facing the right-side recessed part 7 of the seat cushion 1. The second engagement part 33b is provided to be spaced from the first engagement part 33a in the axis direction. By the movement of the rotation shaft 32 in the axis direction, the second engagement part 33b is switched between the state where it engages with the gear 22 of the gap adjustment mechanism 20 that makes the vertical movement of the right plate 12 and the state where it does not engage therewith.

When the rotation shaft 32 is pushed in the axis direction and the first engagement part 33a engages with the gear 22 on the left plate 11 side, the second engagement part 33b does not engage with the gear 22 on the right plate 12 side. Further, when the rotation shaft 32 is pulled out in the axis direction and the second engagement part 33b engages with the gear 22 on the right plate 12 side, the first engagement part 33a does not engage with the gear 22 on the left plate 11 side.

Thus, when the driver operates the dial 31 to move the rotation shaft 32 in the axis direction, it is possible to allow the first engagement part 33a or the second engagement part 33b to engage with the gear 22 exclusively. Thereby, the clearance from the back surface 28 of the seating surface 2 of the seat cushion 1 can be adjusted by allowing the left plate 11 and the right plate 12 to make the vertical movement independently.

Thus, a sinking amount of the seat cushion 1 is adjusted independently at the left thigh holding part 2a and the right thigh holding part 2b in the seating surface 2. Therefore, the hardness of the seat cushion 1 can be adjusted independently at the left thigh holding part 2a and the right thigh holding part 2b.

Incidentally, the first engagement part 33a and the second engagement part 33b are formed to have the same diameter, and to have the diameter larger than the gear 22. This makes it possible to speed up the operation of the dial 31 by the driver, and to adjust the height of the left plate 11 and the right plate 12 with a smaller operation amount.

As illustrated in FIG. 2, the seat cushion device 100 is provided with a pair of cover members 13 that is provided between the left plate 11 and the left-side recessed part 6 and between the right plate 12 and the right-side recessed part 7, respectively.

The cover members 13 prevent sliding contact between the left plate 11 and the left-side recessed part 6 and sliding contact between the right plate 12 and the right-side recessed part 7, when the driver moves the left plate 11 or the right plate 12 vertically, or when the driver is seated on the seating surface 2 and the seat cushion 1 sinks.

The cover members 13 are covers that are made of rubber and that respectively cover from the top surfaces of the left plate 11 and the right plate 12 to the both side surfaces of the parallel link mechanisms 21. A side surface 13a of each of the cover members 13 is formed to have a bellows shape to be able to extend vertically. When the cover members 13 are provided, direct contact between the seat cushion 1 and the left plate 11 and the right plate 12 can be avoided. Thereby, scraping of the seat cushion 1 due to the sliding contact with the left plate 11 or the right plate 12 can be avoided.

Figure 4:
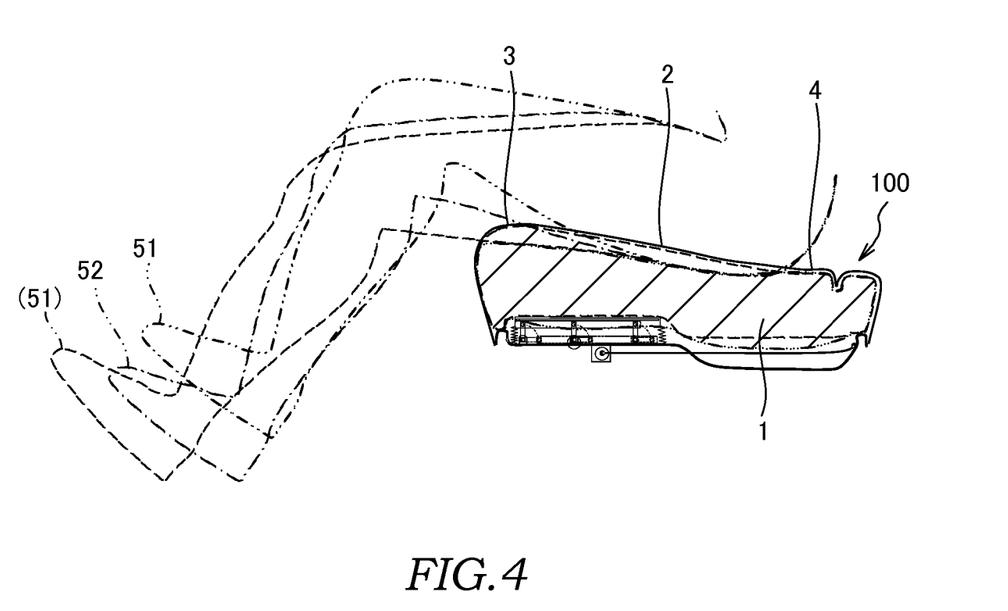
FIG. 4 is a side view explaining the operation of the seat cushion device.

Next, the operation of the seat cushion device 100 will be explained with reference to FIG. 4 and FIG. 5.

When the automobile, to which the seat cushion device 100 is applied, is the manual transmission vehicle, the driver operates an accelerator pedal and a brake pedal by a right leg 52, and operates a clutch pedal by a left leg 51. As an operation stroke for the accelerator pedal and the brake pedal is relatively small, as illustrated in FIG. 4, the driver can make the operation while leaving the heel of the right leg 52 placed on the floor surface. Meanwhile, as the operation stroke for the clutch pedal is large, the driver needs to raise the heel of the left leg 51 from the floor surface and step on the pedal fully.

Figure 5:
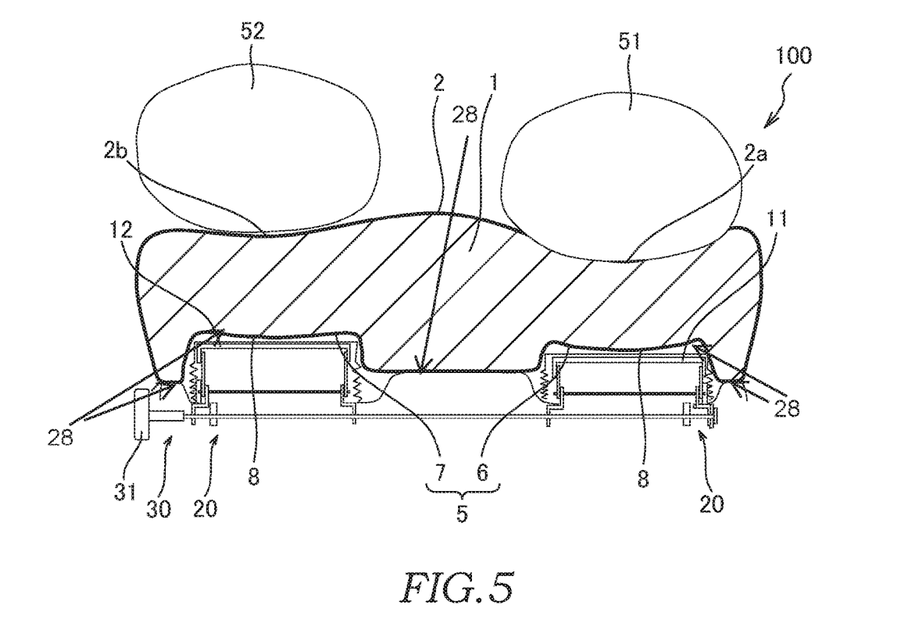
FIG. 5 is a cross-sectional view of the front of FIG. 4.

For this reason, when the automobile, to which the seat cushion device 100 is applied, is the manual transmission vehicle, the driver operates the dial 31 to lower the left plate 11 and increase the clearance between the top surface part 8 of the left-side recessed part 6 and the left plate 11, and at the same time, to raise the right plate 12 to reduce the clearance between the top surface part 8 of the right-side recessed part 7 and the right plate 12, as illustrated in FIG. 5.

When the driver is seated in this state, the left thigh holding part 2a of the seat cushion 1 sinks deeply, by the large amount of the clearance, due to the weight of the left leg 51 of the driver. Meanwhile, the sinking amount of the right thigh holding part 2b of the seat cushion 1 is reduced by the amount of the clearance that is smaller than that beneath the left thigh holding part 2a.

Thereby, the seat cushion 1 at the right thigh holding part 2b for holding the right leg 52 that operates the accelerator pedal and the brake pedal becomes hard, and the seat cushion 1 at the left thigh holding part 2a for holding the left leg 51 that operates the clutch pedal becomes softer as compared with the right thigh holding part 2b.

As the hardness of the seat cushion 1 can be adjusted independently on the left and right sides of the seat cushion 1, the hardness of the seat cushion can be adjusted according to the need of the driver due to the difference in the driving operation. This makes it possible to bring the left thigh holding part 2a of the seat cushion 1 into contact softly with the left leg 51, and to relieve fatigue of the driver.

Incidentally, when the automobile, to which the seat cushion device 100 is applied, is an automatic transmission vehicle, it is not necessary for the driver to move the left leg 51, although the operation by the right leg 52 of the driver is the same as the above-described operation. In this case, the driver may operate the dial 31 so as to increase the hardness of the seat cushion 1 at the left thigh holding part 2a for holding the left leg 51.

When the driver of the automobile drives mainly in town, the frequency of operating the clutch pedal is high as the shift is changed frequently, but when the driver of the automobile drives mainly on expressway, the frequency of operating the clutch pedal is low as the shift is changed less frequently. In this case, when the frequency of operating the clutch pedal is high, the driver may operate the dial 31 so as to reduce the hardness of the seat cushion 1 at the left thigh holding part 2a, and, when the frequency of operating the clutch pedal is low, the driver may operate the dial 31 so as to increase the hardness of the seat cushion 1 at the left thigh holding part 2a, as compared with the case where the frequency of operating the clutch pedal is high.

The dial 31 that can be operated manually by the driver is provided as the gear rotation mechanism 30, according to the above-described embodiment. Instead of this, however, a pair of electric motors including an output shaft that engages with the gears 22 may be provided. In this case, a switch for operating the electric motors is provided instead of the dial 31.

The following effects can be obtained by the first embodiment as described thus far.

The clearance from the back surface 28 of the seating surface 2 of the seat cushion 1 can be adjusted by vertically moving the left plate 11 and the right plate 12 independently. Therefore, the sinking amount of the seat cushion 1 is adjusted independently at the left thigh holding part 2a and the right thigh holding part 2b in the seating surface 2. Therefore, the hardness of the seat cushion 1 can be adjusted independently at the left thigh holding part 2a and the right thigh holding part 2b. Thus, the hardness of the seat cushion can be adjusted according to the need of the driver due to the difference in the driving operation.

Second Embodiment

Figure 6:
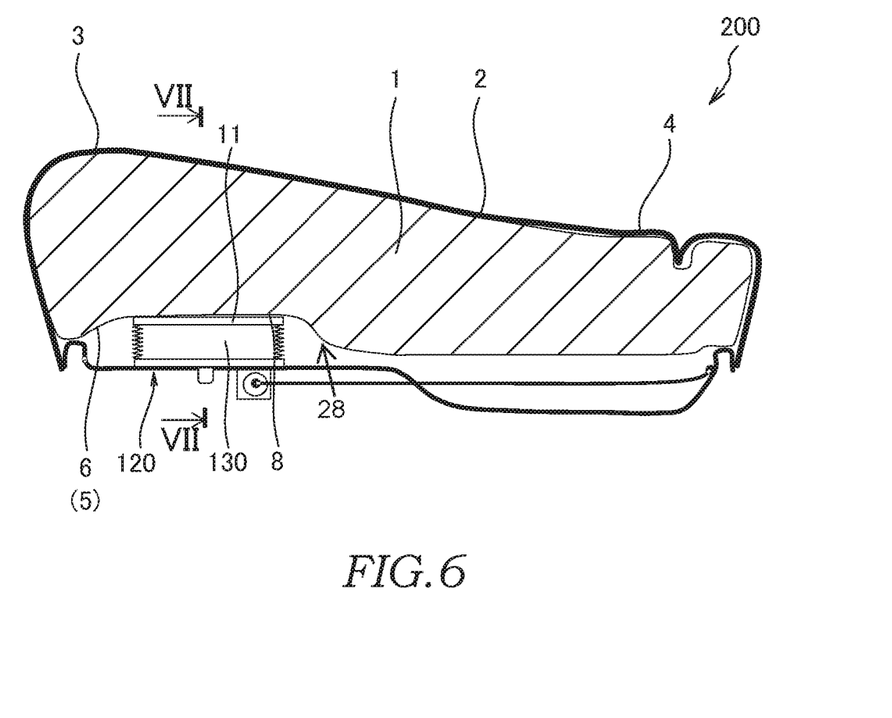
FIG. 6 is a side view of a seat cushion device according to a second embodiment of the present invention.

Hereinafter, a seat cushion device 200 according to a second embodiment of the present invention will be explained with reference to FIG. 6 to FIG. 8. Incidentally, according to the second embodiment, the same reference numerals are given to designate the same components as those of the first embodiment described above, and repeated explanations will be omitted as appropriate.

The second embodiment is different from the first embodiment in that the hardness of the seat cushion 1 is adjusted by using compressed air.

First, the structure of the seat cushion device 200 will be explained with reference to FIG. 6 and FIG. 7.

The seat cushion device 200 is provided with the seat cushion 1 including the seating surface 2, on the upper surface of which the driver is seated, the left plate 11 that is movable vertically inside the left-side recessed part 6, the right plate 12 that is movable vertically inside the right-side recessed part 7, and a pair of gap adjustment mechanisms 120 that moves the left plate 11 and the right plate 12 vertically in a separated manner, and that is able to adjust the clearance from the back surface 28 of the seat cushion 1.

The pair of the gap adjustment mechanisms 120 is provided beneath the seat cushion 1 on the right and left sides. The structure of the gap adjustment mechanism 120 that moves the right plate 12 vertically is the same as that of the gap adjustment mechanism 120 that moves the left plate 11 vertically, and therefore, an explanation will be given only to the gap adjustment mechanism 120 that moves the left plate 11 vertically.

Figure 7:
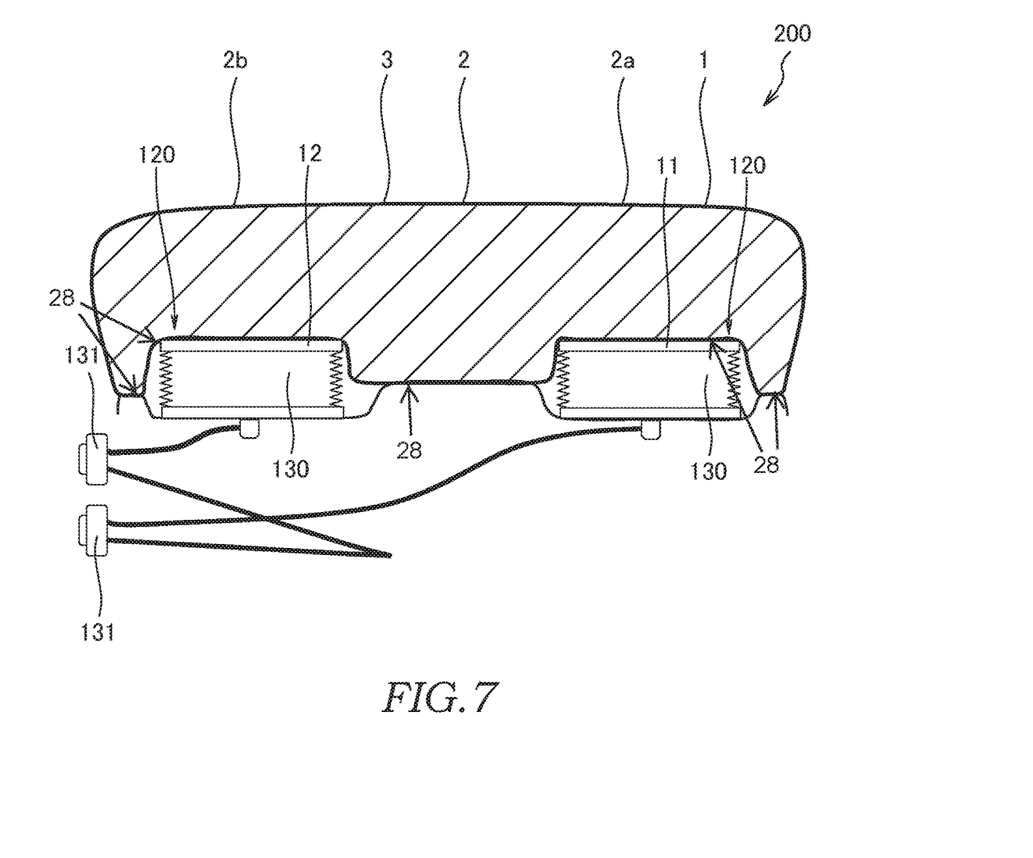
FIG. 7 is a cross-sectional view taken along the VII-VII line in FIG. 6.

As illustrated in FIG. 7, the gap adjustment mechanism 120 is provided with a fluid pressure pack 130 that inflates/deflates by the pressure of a supplied/discharged working fluid so as to allow the left plate 11 to make parallel movement vertically, and supplying/discharging switches 131 that can switch between the supply and the discharge of the working fluid to/from the fluid pressure pack 130.

The working fluid to be supplied to the fluid pressure pack 130 is the compressed air. When the automobile is a large vehicle, a compressor for compressing the air and an air surge tank for storing the compressed air are provided, and therefore, the compressed air is supplied from the compressor or the air surge tank.

The side surface of the fluid pressure pack 130 is formed to have a bellows shape to be able to extend vertically. This allows the left plate 11 to ascend when the compressed air is supplied to the fluid pressure pack 130, and the left plate 11 to descend when the compressed air is discharged from the fluid pressure pack 130.

The supplying/discharging switches 131 are provided near the right-side surface of the seat cushion 1. When the automobile is the car with the right-side steering wheel, the supplying/discharging switches 131 can be operated by the right hand while the driver is seated. Incidentally, when the automobile is the car with the left-side steering wheel, the supplying/discharging switches 131 may be provided near the left-side surface of the seat cushion 1, similarly to the dial 31.

Figure 8:
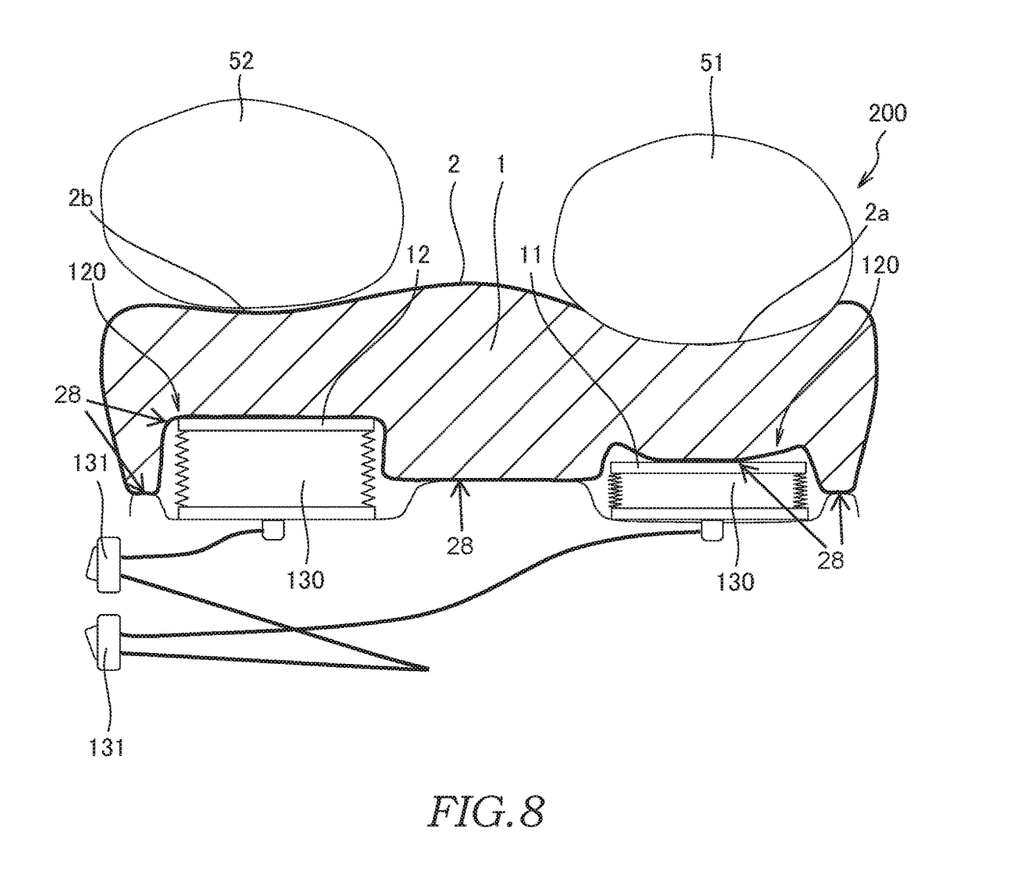
FIG. 8 is a cross-sectional view of the front explaining the operation of the seat cushion device according to the second embodiment of the present invention.

When the driver operates the pair of supplying/discharging switches 131 like this, the vertical movement of the left plate 11 and the right plate 12 can be made independently, so as to adjust the clearance from the back surface 28 of the seating surface 2 of the seat cushion 1, as illustrated in FIG. 8.

Thus, the sinking amount of the seat cushion 1 is adjusted independently at the left thigh holding part 2a and the right thigh holding part 2b in the seating surface 2. Therefore, the hardness of the seat cushion 1 can be adjusted independently at the left thigh holding part 2a and the right thigh holding part 2b.

According to the second embodiment as described thus far, the hardness of the seat cushion 1 can be adjusted independently at the left thigh holding part 2a and the right thigh holding part 2b, similarly to the first embodiment. Therefore, the hardness of the seat cushion can be adjusted according to the need of the driver due to the difference in the driving operation.

Embodiments of this invention were described above, but the above embodiments are merely examples of applications of this invention, and the technical scope of this invention is not limited to the specific constitutions of the above embodiments.

This application claims priority based on Japanese Patent Application No. 2011-274650 filed with the Japan Patent Office on Dec. 15, 2011, the entire contents of which are incorporated into this specification.

The embodiments of this invention in which an exclusive property or privilege is claimed are defined as follows:

1. A seat cushion device capable of adjusting hardness of a seat cushion including a seating surface, on which a user is seated, the seat cushion device comprising:
   a recessed part that is formed in a back surface of the seating surface in the seat cushion;
   a left plate that faces a back surface of a left thigh holding part of the seating surface, on which a left leg thigh of the user is locatable, and that is movable inside the recessed part vertically;
   a right plate that faces a back surface of a right thigh holding part of the seating surface, on which a right leg thigh of the user is locatable, and that is movable inside the recessed part vertically; and
   a gap adjustment mechanism that is configured to move the left plate and the right plate vertically in an independent manner to adjust a clearance from the back surface of the seating surface so that
      a topmost surface of the left plate does not press against a portion of the back surface of the left thigh holding part in a vertical direction, the portion of the back surface of the left thigh holding part being located forward from a part of the topmost surface of the left plate, and
      a topmost surface of the right plate does not press against a portion of the back surface of the right thigh holding part in the vertical direction, the portion of the back surface of the right thigh holding part being located forward from a part of the topmost surface of the right plate,
   the gap adjustment mechanism is configured to position the left and right plates so that while the left and right plates are being moved by the gap adjustment mechanism to adjust the clearance, the clearance includes
      a left air gap between the topmost surface of the left plate and the portion of the back surface of the left thigh holding part, and
      a right air gap between the topmost surface of the right plate and the portion of the back surface of the right thigh holding part.

2. The seat cushion device according to claim 1, wherein the gap adjustment mechanism includes
   a pair of parallel link mechanisms that is configured to respectively guide the left plate and the right plate vertically,
   a pair of gears that is configured to respectively swing the pair of the parallel link mechanisms by rotation, and a gear rotation mechanism that is configured to be able to respectively make a rotation operation of the pair of the gears.

3. The seat cushion device according to claim 2, wherein the gear rotation mechanism includes a pair of electric motors including an output shaft that engages with the gears.

4. The seat cushion device according to claim 2, further comprising a pair of cover members that is configured to respectively cover from top surfaces of the left plate and the right plate to both side surfaces of the parallel link mechanisms, and that prevents contact with the seat cushion.

5. The seat cushion device according to claim 2, further comprising a pair of cover members that is configured to respectively cover from top surfaces of the left plate and the right plate to two opposite side surfaces of the parallel link mechanisms, and that prevents contact between the seat cushion and the left and right plates.

6. The seat cushion device according to claim 1, wherein the gap adjustment mechanism includes
gears, and
a gear rotation mechanism that includes
a dial that is provided so that the user can make a rotation operation,
a rotation shaft that is provided coaxially with the dial and that is movable in an axis direction, and
an engagement part that is engageable with each of the gears by the movement of the rotation shaft in the axis direction, and that rotates by the rotation operation of the dial, and
wherein the engagement part engages with one of the gears, that vertically moves the left plate when the user moves the rotation shaft to a first position in the axis direction, and engages with another of the gears, that vertically moves the right plate when the user moves the rotation shaft to a second position that is different from the first position.

7. The seat cushion device according to claim 1, wherein the gap adjustment mechanism includes a pair of fluid pressure packs that is configured to inflate/deflate by pressure of a supplied/discharged working fluid so as to allow the left plate and the right plate to make parallel movement vertically.

8. A seat cushion device capable of adjusting hardness of a seat cushion including a seating surface, on which a user is seated, the seat cushion device comprising:
a recessed part that is formed in a back surface of the seating surface in the seat cushion;
a left plate that faces a left portion of the back surface at a left thigh holding part, on which a left leg thigh of the user is locatable, and that is movable inside the recessed part vertically;
a right plate that faces a right portion of the back surface at a right thigh holding part, on which a right leg thigh of the user is locatable, and that is movable inside the recessed part vertically; and
a gap adjustment mechanism that is configured to move the left plate and the right plate vertically in an independent manner from each other to separately adjust a left clearance between the left plate and the left portion of the back surface, and a right clearance between the right plate and the right portion of the back surface, so that
a topmost surface of the left plate does not press against a first portion of the left portion of the back surface in a vertical direction, the first portion being located forward from a part of the topmost surface of the left plate, and
a topmost surface of the right plate does not press against a second portion of the right portion of the back surface in the vertical direction, the second portion being located forward from a part of the topmost surface of the right plate,
the gap adjustment mechanism is configured so that while the left and right plates are being moved by the gap adjustment mechanism to adjust the left and right the clearances,
the left clearance includes a left air gap between the topmost surface of the left plate and the first portion, and
the right clearance includes a right air gap between the topmost surface of the right plate and the second portion.

9. The seat cushion device according to claim 8, wherein the gap adjustment mechanism includes
a pair of parallel link mechanisms that is configured to respectively guide the left plate and the right plate vertically,
a pair of gears that is configured to respectively swing the pair of the parallel link mechanisms by rotation, and
a gear rotation mechanism that is configured to be able to respectively make a rotation operation of the pair of the gears.

10. The seat cushion device according to claim 9, wherein the gear rotation mechanism includes a pair of electric motors including an output shaft that engages with the gears.

11. The seat cushion device according to claim 9, further comprising a pair of cover members that is configured to respectively cover from top surfaces of the left plate and the right plate to both side surfaces of the parallel link mechanisms, and that prevents contact with the seat cushion.

12. The seat cushion device according to claim 9, further comprising a pair of cover members that is configured to respectively cover from top surfaces of the left plate and the right plate to two opposite side surfaces of the parallel link mechanisms, and that prevents contact between the seat cushion and the left and right plates.

13. The seat cushion device according to claim 8, wherein the gap adjustment mechanism includes
gears, and
a gear rotation mechanism that includes
a dial that is provided so that the user can make a rotation operation,
a rotation shaft that is provided coaxially with the dial and that is movable in an axis direction, and
an engagement part that is engageable with each of the gears by the movement of the rotation shaft in the axis direction, and that rotates by the rotation operation of the dial, and
wherein the engagement part engages with one of the gears, that vertically moves the left plate when the user moves the rotation shaft to a first position in the axis direction, and engages with another of the gears, that vertically moves the right plate when the user moves the rotation shaft to a second position that is different from the first position.

14. The seat cushion device according to claim 8, wherein the gap adjustment mechanism includes a pair of fluid pressure packs that is configured to inflate/deflate by pressure of a supplied/discharged working fluid so as to allow the left plate and the right plate to make parallel movement vertically.

15. The seat cushion device according to claim 8, the back surface including a backmost surface of the seat cushion, the recessed part extending through the backmost surface.

16. A seat cushion device capable of adjusting hardness of a seat cushion including a seating surface, on which a user is seated, the seat cushion device comprising:
   a recessed part that is formed in a back surface of the seating surface in the seat cushion, the back surface including a backmost surface of the seat cushion, the recessed part extending through the backmost surface;
   a left plate that faces a back surface of a left thigh holding part of the seating surface, on which a left leg thigh of the user is locatable, and that is movable inside the recessed part vertically;
   a right plate that faces a back surface of a right thigh holding part of the seating surface, on which a right leg thigh of the user is locatable, and that is movable inside the recessed part vertically; and
   a gap adjustment mechanism that is configured to move the left plate and the right plate vertically in an independent manner, and that can adjust a clearance from the back surface of the seating surface so that
      a topmost surface of the left plate does not press against a portion of the back surface of the left thigh holding part in a vertical direction, the portion of the back surface of the left thigh holding part being located forward from a part of the topmost surface of the left plate, and
      a topmost surface of the right plate does not press against a portion of the back surface of the right thigh holding part in the vertical direction, the portion of the back surface of the right thigh holding part being located forward from a part of the topmost surface of the right plate,
   the gap adjustment mechanism is configured so that while the left and right plates are being moved by the gap adjustment mechanism to adjust the clearance, the clearance includes
      an air gap between the topmost surface of the left plate and the portion of the back surface of the left thigh holding part, and
      an air gap between the topmost surface of the right plate and the portion of the back surface of the right thigh holding part.

17. The seat cushion device according to claim 1, wherein another portion of the back surface of the left thigh holding part is disposed beneath the left plate, and another portion of the back surface of the right thigh holding part is disposed beneath the right plate.

18. The seat cushion device according to claim 1, wherein the portion of the back surface of the left thigh holding part is disposed over the left plate, and the portion of the back surface of the right thigh holding part is disposed over the right plate.

19. The seat cushion device according to claim 1, wherein the left air gap is directly above another part of the left plate, and the right air gap is directly above another part of the right plate.

20. The seat cushion device according to claim 19, wherein the gap adjustment mechanism is configured to move the left right plates to a position where the left and right air gaps are eliminated when the user is seated on the seat cushion device.

* * * * *